F. HARDINGE.
TOOL HOLDER.
APPLICATION FILED JULY 24, 1916.

1,226,657.

Patented May 22, 1917.
2 SHEETS—SHEET 1.

Witnesses:
Albin C. Ahlberg.
Robert F. Bracke.

Inventor
Franklin Hardinge
By Williams, Bradbury & Lee
Attorneys

F. HARDINGE.
TOOL HOLDER.
APPLICATION FILED JULY 24, 1916.

1,226,657.

Patented May 22, 1917.
2 SHEETS—SHEET 2.

Witnesses:
Albin C. Ahlberg
Robert F. Bracke

Inventor
Franklin Hardinge
By Williams Bradbury & Lee
Attorneys

UNITED STATES PATENT OFFICE.

FRANKLIN HARDINGE, OF CHICAGO, ILLINOIS, ASSIGNOR TO HARDINGE BROTHERS, OF CHICAGO, ILLINOIS, A CORPORATION OF ILLINOIS.

TOOL-HOLDER.

1,226,657. Specification of Letters Patent. Patented May 22, 1917.

Application filed July 24, 1916. Serial No. 110,894.

*To all whom it may concern:*

Be it known that I, FRANKLIN HARDINGE, a citizen of the United States, residing at Chicago, in the county of Cook and State of Illinois, have invented a certain new and useful Improvement in Tool-Holders, of which the following is a full, clear, concise, and exact description, reference being had to the accompanying drawings, forming a part of this specification.

My invention relates to improvements in holders for tools and has for its object the provision of means for holding lathe chucks, collets, and the like, which can be supported under a lathe or work bench and which can be concealed under the lathe or bench or moved outwardly into a position where the tools are easily accessible to the operator.

Figure 2:
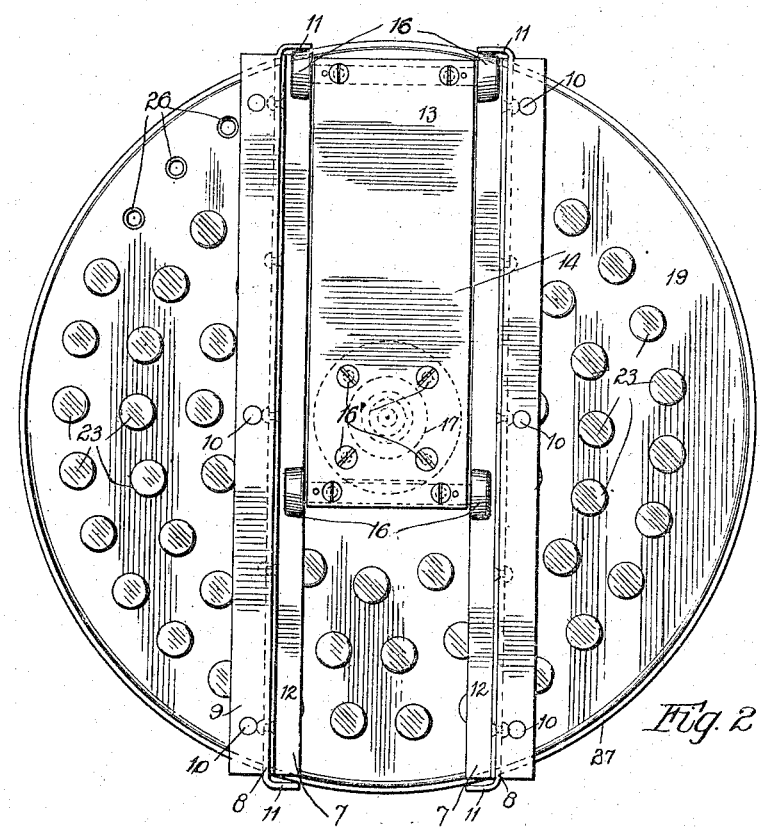
Figure 3:
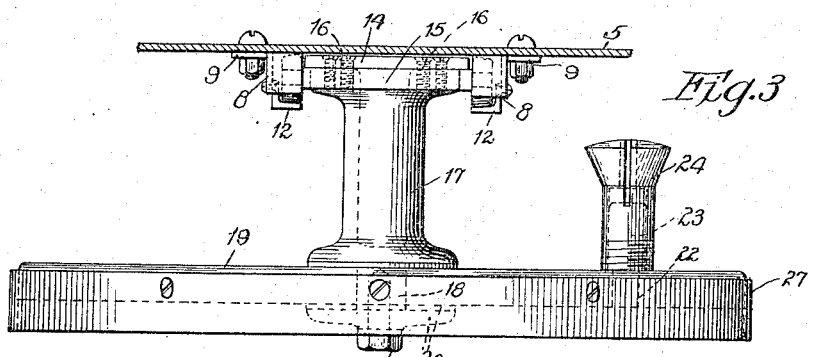

Generally, the device consists of a pair of rails or a tramway adapted to be secured to the under side of a lathe or work bench. A carriage is mounted on the tramway and is arranged to ride to and fro either toward or away from the front edge of the lathe or bench. The tool holder in the preferred form of my invention takes the form of a disk and is rotatably connected with the under side of the carriage. Suitable means are provided on this disk for holding the chucks, each one of the holders carrying suitable indicia to enable the operator to immediately distinguish the chucks from one another. When it is desired to move the holder to a position where the chucks are accessible the carriage is moved along its tramway until the holder is brought to a position extending outwardly from the front edge of the lathe or bench and in order to bring any portion of the tool holding disk in front of the operator it is only necessary to rotate the disk upon its axis. After a collet has been removed from the holder the holder, together with the carriage, may be returned to its normal position under the lathe or bench out of the way of the workman. These and other objects of my invention will be more fully pointed out in connection with the accompanying drawings in which, Figure 1 is a view partly in elevation and partly in section showing the device of my invention attached to the under side of a lathe;

Fig. 2 is a plan view of the device of my invention; and Fig. 3 is a front view thereof showing the tramway connected to a lathe or bench.

Similar characters of reference refer to similar parts throughout the several views.

Figure 1:
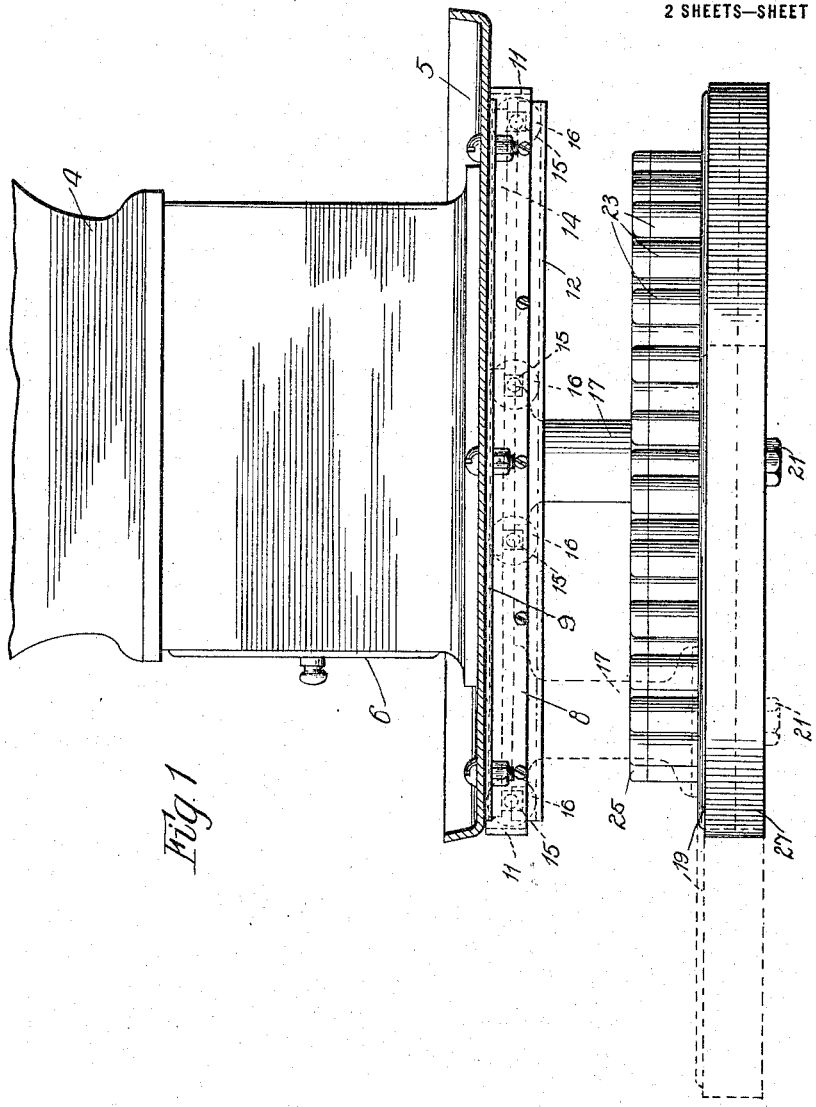

Although, as I have before stated, the device of my invention is not only applicable to lathes, but may be used as well with a work bench of any kind, I have illustrated in Fig. 1 a lathe at 4 which is provided with the usual shelf 5 for holding the work, tools, etc. The front of the lathe is illustrated at 6 in this figure. Attached to the under side of the lathe shelf 5 and running from the front edge of the shelf toward the rear thereof is a pair of parallel rails 7—7. Each rail, as most clearly illustrated in Figs. 2 and 3, consists of a strip 8 bent at 9 and provided at the last mentioned bent portion with apertures 10—10 for the reception of screws, bolts, or other suitable means for connecting the rail with the lathe or bench. The front and rear ends of the member 8 are bent as illustrated at 11—11 in Fig. 2 to provide a positive stop for the carriage subsequently to be described. Attached to the strip 8 and running substantially the full length of the strip is an angle iron 12. The front end of each of the rails is disposed as near to the front edge of the lathe as is possible, as most clearly shown in Fig. 1, so as to allow the work holder to be moved from under the lathe to a position where every portion of the holder is accessible, as will be pointed out hereinafter.

Arranged to ride to and fro upon the angle irons 12, which form the tramway or rails, is a carriage 13 consisting of a base member 14 and two shaft or axle pieces 15, each one of the axle pieces being provided with two wheels illustrated at 16. The angle irons 12 are tapered toward their outer ends and the wheels taper correspondingly toward the outside with the result that the carriage is always centrally located between the rails. Furthermore, by means of this construction and in addition to the construction of the rails, it is unnecessary to provide means on the axle sections 15—15 to hold the wheels upon the same.

Attached to the base plate 14 of the carriage by means of the screws 16'—16' is a post 17 extending downwardly from the base plate between the rails. Attention is directed to the fact that the post 17 is not positioned in the center of the carriage, but is, on the other hand, secured to the carriage at its front edge or as near thereto as is practicable. The post 17 has a downwardly extending centrally located stud 18 upon which is rotatably mounted the tool holder or disk 19, the holder being held in place upon the post by means of the washers 20 and screw 21 threading into the stud 18. The tool holder or disk has formed therein a plurality of holes, one of which is illustrated at 22 in Fig. 3, each hole receiving a peg 23 which is arranged to receive and hold in place a chuck or collet, one of which is shown at 24 in Fig. 3. These pegs are preferably constructed of wood and to finish off the top ends of each of the pegs and to reinforce the same each peg may be fitted with a brass cap 25, these caps being stamped or in some way marked with the indicia desired to enable the operator to distinguish the chucks or collets from one another.

As illustrated in Fig. 2 the holder is provided also with a plurality of tapered apertures 26 each arranged to receive a tail stock center or similar tool. To enable the operator to easily grasp the tool holder to cause movement of the carriage relative to its tramway the holder disk has attached to it around its periphery a metallic band 27, the width of the band being somewhat greater than the thickness of the disk thereby leaving a space behind the metallic band and under the holder into which the operator may place his fingers and pull the carriage to a position where the tools are accessible.

From the foregoing description the operation of my invention will be apparent. Fig. 1 shows the tool holder disposed underneath the lathe. When a chuck is to be placed on the holder or one removed therefrom, or both, the operator takes hold of the band 27 and pulls the holder forwardly to the position illustrated in dotted lines in Fig. 1, the forward movement, as well as the rearward movement, of the carriage being limited by means of the bent over portions 11—11 provided on the strips 8—8. After the holder has been moved to this advanced position it may be rotated so that any one of the several pegs or apertures carried by and provided in the same may be moved to a position to receive a tool or to permit the removal of a tool therefrom. On account of the eccentric location of the post 17, that is, the extreme front end location of this post relative to the carriage practically the entire tool holder may be moved beyond the front edge of the lathe.

Having thus described my invention what I claim as new and desire to secure by Letters Patent of the United States is:

1. A tool holder comprising a tramway adapted to be secured to the under side of a lathe, a downwardly extending post mounted on the tramway and arranged to ride thereon, and a tool holder rotatably mounted on the post under the tramway whereby the tool holder may be moved under the lathe or to a position where it projects outwardly from the lathe and whereby the holder may be rotated to provide free access to every portion thereof.

2. In a tool holder the combination of a tramway arranged to be attached to the underside of a lathe, a carriage movable thereon, and a tool holder rotatably mounted on the carriage, whereby the tool holder may be moved under the lathe or to a position where it projects outwardly from the lathe and whereby the tool holder may be rotated to provide free access to every portion thereof.

3. A tool holder comprising a tramway arranged to be secured to the under side of a lathe, a carriage provided with wheels arranged to ride on the tramway, a post extending downwardly from the carriage, and a tool holder rotatably mounted on the post under the tramway.

4. A tool holder comprising a pair of rails arranged to be attached to the underside of a lathe, a carriage provided with wheels mounted on the rails so as to ride thereon, a post extending downwardly from the carriage between the rails, and a tool holder rotatably mounted on the post under the rails.

5. A tool holder comprising a pair of rails arranged to be attached to the under side of a lathe, a carriage provided with wheels mounted on the rails so as to ride thereon, a post extending downwardly from the front end of the carriage and between the rails, and a tool holding disk rotatably mounted on the post under the rails.

6. In a tool holder the combination of a carriage, rails therefor arranged to be attached to the under side of a lathe, and a tool holder rotatably mounted on the under side of the carriage.

7. A tool holder comprising a tramway adapted to be secured to the under side of a lathe, a downwardly extending post mounted on the tramway and arranged to ride thereon, a tool holding disk rotatably mounted on the post under the tramway, and a band encircling the disk and extending beyond the lower face of the disk to provide means whereby the disk may be easily grasped and moved to the position desired.

8. A tool holder comprising a support arranged to be attached to the underside of a lathe, said support having a pivot member arranged to be moved under the lathe or to a position in front or near the front of the lathe, and a tool holder rotatably mounted on the pivot member whereby the holder may be moved under the lathe or to a position where it projects outwardly from the lathe and whereby the holder may be rotated to provide free access to every portion thereof.

In witness whereof, I hereunto subscribe my name this 19th day of July, A. D. 1916.

FRANKLIN HARDINGE.

Witnesses:
ROBERT F. BRACKE,
MARY A. COOK.